(12) United States Patent
Hoshino et al.

(10) Patent No.: US 11,613,232 B2
(45) Date of Patent: Mar. 28, 2023

(54) DEFROSTING CONTROL SYSTEM, NON-TRANSITORY COMPUTER READABLE MEDIUM STORING DEFROSTING CONTROL PROGRAM, AND VEHICLE CONTROL MODULE

(71) Applicant: TOYOTA JIDOSHA KABUSHIKI KAISHA, Toyota (JP)

(72) Inventors: Yu Hoshino, Toyota (JP); Kunihiko Jinno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 754 days.

(21) Appl. No.: 16/705,349

(22) Filed: Dec. 6, 2019

(65) Prior Publication Data

US 2020/0223398 A1 Jul. 16, 2020

(30) Foreign Application Priority Data

Jan. 10, 2019 (JP) .............................. JP2019-002539
Jun. 18, 2019 (JP) .............................. JP2019-112777

(51) Int. Cl.
*B60S 1/02* (2006.01)
*H05B 3/84* (2006.01)
*H04N 23/65* (2023.01)
*H04N 23/66* (2023.01)

(52) U.S. Cl.
CPC .............. *B60S 1/026* (2013.01); *H04N 23/65* (2023.01); *H04N 23/66* (2023.01); *H05B 3/84* (2013.01)

(58) Field of Classification Search
CPC ............................ B60S 1/026; H04N 5/23203; H04N 5/23241; H05B 3/84; H05B 3/0042; H05B 2214/02; B60H 1/00771; B60H 1/00657; B60H 1/00785; H05N 23/65; H05N 23/66
See application file for complete search history.

(56) References Cited

U.S. PATENT DOCUMENTS

| | | | |
|---|---|---|---|
| 11,001,231 B1 * | 5/2021 | Hedman | B60H 1/00771 |
| 2018/0222281 A1 | 8/2018 | Tamane et al. | |
| 2020/0156593 A1 * | 5/2020 | Boss | B60S 1/3463 |

FOREIGN PATENT DOCUMENTS

| | | | |
|---|---|---|---|
| CN | 108382157 A | 8/2018 | |
| DE | 10 2018 101 378 A1 | 8/2018 | |
| FR | 3 066 740 A1 | 11/2018 | |
| FR | 3114997 A1 * | 4/2022 | |
| GB | 2593120 A * | 9/2021 | B60H 1/0073 |

(Continued)

*Primary Examiner* — Shawntina T Fuqua
(74) *Attorney, Agent, or Firm* — Oblon, McClelland, Maier & Neustadt, L.L.P.

(57) ABSTRACT

A defrosting control system includes processing circuitry. The processing circuitry calculates a frost formation rate, indicating a frost formation amount of a windowpane on which frost is formed at an estimated departure time of a vehicle, based on frost formation information and the estimated departure time. The processing circuitry calculates an operation period of a defroster needed to remove frost from the windowpane based on the frost formation rate. The processing circuitry determines that an activation time of the defroster is a time earlier than the estimated departure time by the operation period. The processing circuitry transmits an operation request signal for starting operation of the defroster at the activation time.

6 Claims, 5 Drawing Sheets

(56) References Cited

FOREIGN PATENT DOCUMENTS

| | | | | |
|---|---|---|---|---|
| JP | 2000-301928 A | | 10/2000 | |
| JP | 2004268855 A | * | 9/2004 | ......... B60H 1/00785 |
| JP | 2006-347294 A | | 12/2006 | |
| JP | 2010-234905 A | | 10/2010 | |
| JP | 2013-39841 A | | 2/2013 | |
| JP | 2014-43212 A | | 3/2014 | |
| JP | 2014-180958 A | | 9/2014 | |
| KR | 20120027855 A | * | 3/2012 | |

* cited by examiner

DEFROSTING CONTROL SYSTEM, NON-TRANSITORY COMPUTER READABLE MEDIUM STORING DEFROSTING CONTROL PROGRAM, AND VEHICLE CONTROL MODULE

BACKGROUND

1. Field

The present disclosure relates to a defrosting control system, a non-transitory computer readable medium storing a defrosting control program, and a vehicle control module.

2. Description of Related Art

Japanese Laid-Open Patent Publication No. 2000-301928 discloses an electric automobile executing a pre-air-conditioning operation that operates a heater in the passenger compartment in advance, before departure of the vehicle, while a switch of the vehicle for traveling is switched off. During execution of the pre-air-conditioning operation, when the ambient temperature is less than or equal to a set temperature, defrosting control is executed for a predetermined period. This defrosting control blows warm air onto the interior surface of the front window at the maximum flow rate.

The above patent document describes a technique that constantly executes defrosting control for a uniform period. In this case, depending on the level of frost formed on the front window, the period for executing defrosting control may be excessive for the frost formation level. In this case, excess power is consumed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a defrosting control system. The defrosting control system includes processing circuitry. The processing circuitry includes an information obtainment unit configured to obtain frost formation information that is information about formation of frost on a windowpane of a vehicle, an estimated departure time obtainment unit configured to obtain an estimated departure time of the vehicle, a frost formation rate calculator configured to calculate a frost formation rate based on the frost formation information and the estimated departure time, the frost formation rate indicating a frost formation amount of the windowpane, on which frost is formed at the estimated departure time, an operation period calculator configured to calculate an operation period of a defroster, an operation start time determination unit configured to determine an activation time of the defroster, and a defrosting controller configured to transmit an operation request signal for requesting operation of the defroster. The operation period calculator is configured to calculate the operation period needed to remove frost from the windowpane based on the frost formation rate. The operation start time determination unit is configured to determine that the activation time is a time earlier than the estimated departure time by the operation period. The defrosting controller is configured to transmit the operation request signal for starting operation of the defroster at the activation time.

An aspect of the present disclosure provides a non-transitory computer readable medium storing a defrosting control program. When run by one or more computers, the defrosting control program causes the one or more computers to execute an information obtaining process that obtains frost formation information that is information about formation of frost on a windowpane of a vehicle, an estimated departure time obtaining process that obtains an estimated departure time of the vehicle, a frost formation rate calculating process that calculates a frost formation rate based on the frost formation information and the estimated departure time, the frost formation rate indicating a frost formation amount of the windowpane, on which frost is formed at the estimated departure time, an operation period calculating process that calculates an operation period of a defroster, an operation start time determining process that determines an activation time of the defroster, and a defrosting controlling process that transmits an operation request signal for requesting operation of the defroster. The operation period calculating process includes a process calculating the operation period needed to remove frost from the windowpane based on the frost formation rate. The operation start time determining process includes a process determining that the activation time is a time earlier than the estimated departure time by the operation period. The defrosting controlling process includes a process transmitting the operation request signal for starting operation of the defroster at the activation time.

An aspect of the present disclosure provides a vehicle control module. The vehicle control module is connected to a server storing information on a vehicle by an external communication network. The vehicle control module includes a transmitter configured to transmit coordinates of a current position of the vehicle to the server and a receiver configured to receive an operation request signal for starting operation of a defroster at an activation time that is calculated based on the coordinates of the current position of the vehicle.

An aspect of the present disclosure provides a vehicle control module. The vehicle control module is connected to a server storing information on a vehicle by an external communication network. The vehicle control module includes a transmitter configured to transmit an image of a windowpane of the vehicle, which is captured by a camera configured to capture an image of the windowpane, to the server, and a receiver configured to receive an operation request signal for starting operation of a defroster at an activation time that is calculated based on the image of the windowpane.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a defrosting control system will now be described with reference to the drawings.

Figure 1:
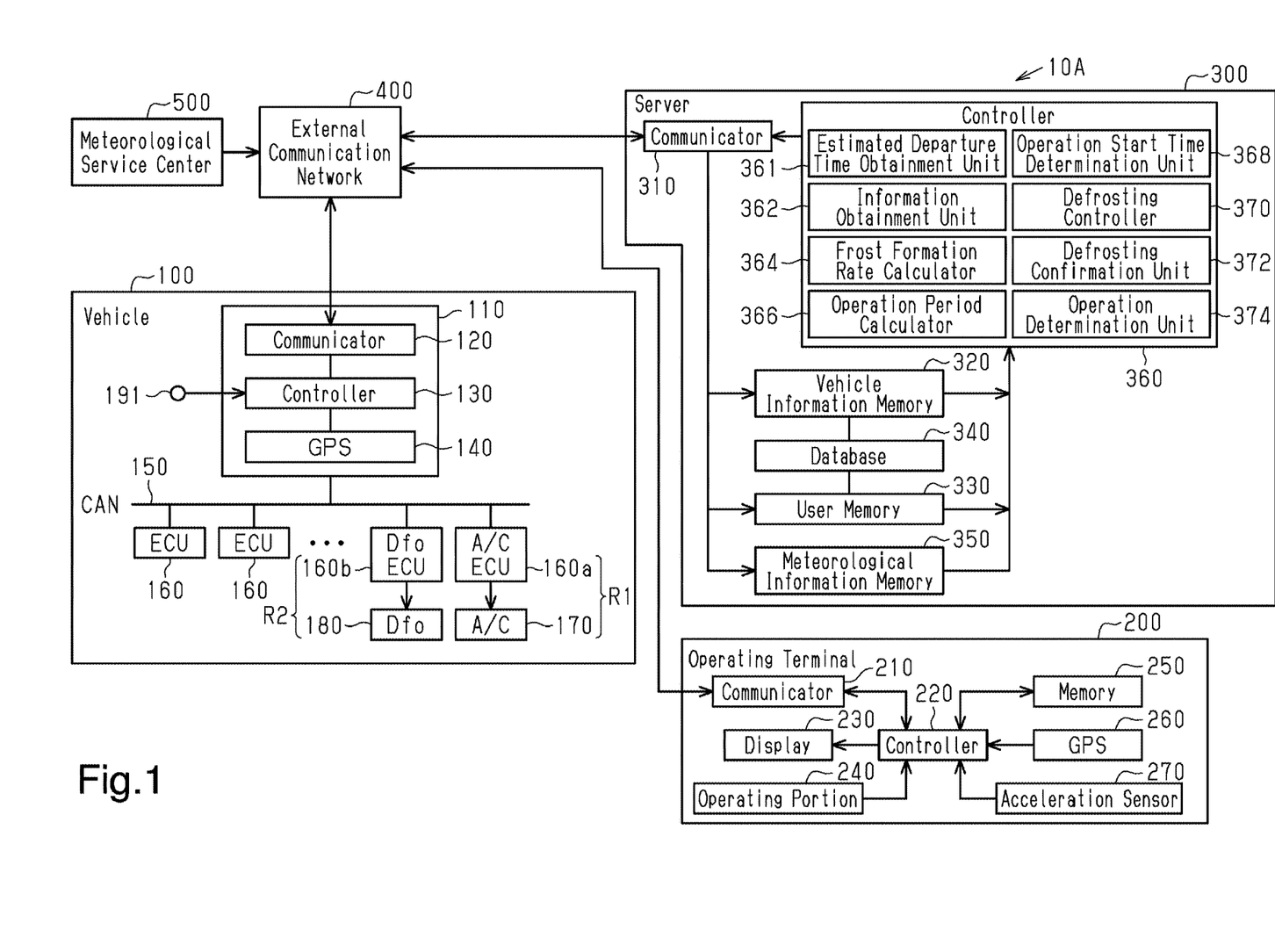
FIG. 1 is a schematic diagram showing the configuration of control related to pre-defrosting.

The entire configuration of control systems in a vehicle, an operating terminal, and a server that are related to defrosting prior to departure of the vehicle will now be described. As shown in FIG. 1, a control module 110 installed on a vehicle 100, which is, for example, an electric automobile, an operating terminal 200, and a server 300 that collects and stores information on the vehicle 100 are configured to perform information communication with each other through an external communication network 400. The server 300 configures a defrosting control system 10A.

The control module 110 of the vehicle 100 includes a communicator 120 that performs information communication with the server 300 through the external communication network 400, a controller 130 that executes various calculations and controls the information communication performed by the communicator 120 and transmission and reception of signals to and from ECUs 160, which will be described later, and a GPS 140 that detects the coordinates of the current position of the vehicle 100. The controller 130 includes a transmitter that transmits various kinds of information including the coordinates of the current position of the vehicle 100 to the server 300 via the communicator 120. The controller 130 further includes a receiver that receives an operation request signal for starting operation of a defroster from the server 300 via the communicator 120. In the present embodiment, the control module 110 incorporates a battery, which is not shown in the drawings. Hence, even when the external supply of power is cut off, the control module 110 is capable of receiving information sent to the control module 110.

The controller 130 receives a signal indicating a state of the vehicle 100 switched by a start switch 191 of the vehicle 100. The start switch 191 switches the state of the vehicle 100 between three states, namely, the OFF state, the ACC state, and the ON state. In the OFF state, the ECUs 160 (described later) are not supplied with power. When the vehicle 100 is in the OFF state and the start switch 191 is pushed, the vehicle 100 is switched to the ACC state. In the ACC state, the ECUs 160 (described later) are supplied with power from a low-voltage battery (not shown) but are not supplied with power from a high-voltage battery (not shown). In the ACC state, while various electric accessories installed on the vehicle 100 may be driven, the vehicle 100 cannot travel because power is not supplied to the drive motor. When the vehicle 100 is in the OFF state or the ACC state and the start switch 191 is pushed with the brake pedal depressed, the vehicle 100 is switched to the ON state. In the ON state, power is supplied from both the low-voltage battery and the high-voltage battery. More specifically, in the ON state, the vehicle 100 is allowed to travel. When the vehicle 100 is in the ON state and the start switch 191 is pushed, the vehicle 100 is switched to the OFF state. In addition to the ON state, the ACC state, and the OFF state, the vehicle 100 may enter a state in which only some of the ECUs 160 are supplied with power from the low-voltage battery.

When the vehicle 100 is switched to the ON state, the controller 130 transmits a signal indicating that the system of the vehicle 100 has been activated from the communicator 120 to the external communication network 400. In addition, when the vehicle 100 is in the ON state, the controller 130 transmits the coordinates of the current position of the vehicle 100 detected by the GPS 140 from the communicator 120 to the external communication network 400 at regular intervals. In the present embodiment, the communicator 120 transmits the coordinates of the current position of the vehicle 100 to the external communication network 400 at one-minute intervals. In addition, the controller 130 executes part of a series of pre-defrosting processes that remove frost in advance from a windowpane of the vehicle 100 prior to departure of the vehicle 100. The pre-defrosting process will be described later. In the description, the front window and the rear window of the vehicle 100 are together referred to as the windowpanes and individually referred to as the front window and the rear window.

The control module 110 is connected to a CAN communication line 150 of a CAN communication system. The ECUs 160 are also connected to the CAN communication line 150 to control the vehicle 100. The control module 110 is configured to transmit and receive various signals to and from the ECUs 160 through the CAN communication line 150.

The vehicle 100 includes an air conditioning ECU 160a, which is one of the ECUs 160 that controls operation of an air conditioner 170 of the vehicle 100. The air conditioner 170 includes an air compressor and a heat exchanger. The air conditioner 170 can be operated in a defroster mode for removing frost from the front window in addition to a cooler-heater mode for regulating the temperature of the passenger compartment. When driven with the defroster mode activated, the air conditioner 170 blows warm air onto the interior surface of the front window of the vehicle 100 at the maximum flow rate. The air-conditioning ECU 160a switches the cooler-heater mode and the defroster mode between activation and deactivation. The air conditioner 170 and the air-conditioning ECU 160a configure a front defroster R1 that removes frost from the front window. As described above, the air-conditioning ECU 160a is connected to the control module 110. Thus, the front defroster R1, which includes the air-conditioning ECU 160a, is connected to the server 300 and the operating terminal 200 via the control module 110 through the external communication network 400.

The vehicle 100 includes a defogger ECU 160b, which is one of the ECUs 160 that controls operation of a defogger 180 configured to remove frost from the rear window of the vehicle 100. The defogger 180 is configured to be an electric circuit including electric heating wires printed on the rear window. The defogger ECU 160b supplies power to the electric heating wires and interrupts the supply of power. The defogger 180 and the defogger ECU 160b configure a rear defroster R2 that removes frost from the rear window. As described above, the defogger ECU 160b is connected to the control module 110. Thus, the rear defroster R2, which includes the defogger ECU 160b, is connected to the server 300 and the operating terminal 200 via the control module 110 through the external communication network 400. In the description below, the front defroster R1 and the rear defroster R2 are together referred to as the defrosters and individually referred as the front defroster R1 and the rear defroster R2.

In the present embodiment, the operating terminal 200 is a mobile phone such as a smartphone carried by the user of the vehicle 100. The operating terminal 200 includes a communicator 210 configured to perform information communication with the server 300 through the external communication network 400 and a controller 220 that controls information communication performed by the communicator 120 and executes various calculations. The controller 220 also executes part of the pre-defrosting process.

The operating terminal 200 further includes a display 230 that shows an output from the controller 220. The display 230 shows a message or an operation icon based on image information output from the controller 220.

The operating terminal 200 includes an operating portion 240 configured to input information into the controller 220. When the operating portion 240 is operated, an operating signal is input to the controller 220. In the present embodiment, the display 230 is a touchscreen, and the display 230 includes the operating portion 240.

The operating terminal 200 includes a memory 250 that stores application programs and various kinds of data. When the controller 220 receives a signal for activating an application program from the operating portion 240 or the server 300, the application program stored in the memory 250 runs.

The operating terminal 200 includes a GPS 260 that detects the coordinates of the current position of the operating terminal 200. The coordinates of the current position of the operating terminal 200 detected by the GPS 260 are input to the controller 220.

The operating terminal 200 includes an acceleration sensor 270 that measures acceleration of the operating terminal 200. The acceleration of the operating terminal 200 detected by the acceleration sensor 270 is input to the controller 220.

The server 300 includes a communicator 310 configured to perform information communication with the control module 110 and the operating terminal 200 through the external communication network 400 and a controller 360 that controls the information communication performed by the communicator 310 and executes various calculations. The controller 360 executes part of the pre-defrosting process. The configuration of the controller 360 related to the pre-defrosting will be described later. The communicator 310 receives meteorological information distributed from a meteorological service center 500 through the external communication network 400.

The server 300 further includes a vehicle information memory 320 that controls vehicle information and a user memory 330 that controls user information. The vehicle information memory 320 and the user memory 330 share a database 340 that stores the vehicle information and the user information. More specifically, in addition to the information on the vehicle 100 and the information on the user of the vehicle 100, the database 340 stores association information that associates the information of the vehicle 100 with the information of the user. That is, the database 340 links the information on the vehicle 100 with the information on the user of the vehicle 100.

The vehicle information memory 320 receives vehicle information from the control module 110 of the vehicle 100, and the information is stored in the database 340. For example, when the vehicle information memory 320 receives a signal indicating that the vehicle 100 has been activated, the database 340 stores the time at which the signal is received as a vehicle activation time. The vehicle activation times for the past few months are stored for each vehicle. In addition, when receiving the coordinates of the current position of the vehicle 100, the database 340 stores the coordinates of the current position. The user memory 330 receives user information from the operating terminal 200, and the information is stored in the database 340.

The server 300 includes a meteorological information memory 350 that stores meteorological information distributed from the meteorological service center 500. The meteorological information distributed from the meteorological service center 500 includes forecasted values of meteorological parameters such as ambient temperature and humidity. The meteorological information memory 350 configures a data memory together with the vehicle information memory 320, the user memory 330, and the database 340.

The configuration of the controller 360 of the server 300 related to the pre-defrosting will now be described.

The controller 360 includes an estimated departure time obtainment unit 361 that obtains an estimated departure time of the vehicle 100. In the present embodiment, the estimated departure time obtainment unit 361 calculates the estimated departure time. More specifically, the estimated departure time obtainment unit 361 determines that a vehicle activation time at which the vehicle 100 entered the ON state, which is stored in the database 340 by the vehicle information memory 320, is a time at which the vehicle 100 was started in the past. Then, the estimated departure time obtainment unit 361 obtains statistics about the frequency of departures of the vehicle 100 and the time of each departure in the past twenty-four hours. The statistics assume that the vehicle 100 will enter the ON state at a time when the frequency of departures of the vehicle 100 is greater than a predetermined threshold value. The estimated departure time obtainment unit 361 calculates that the estimated departure time of the vehicle 100 at which the vehicle 100 will start to travel next is the earliest one of the times at which the frequency of departures of the vehicle 100 is greater than the threshold value after the current time, that is, an estimated time at which the vehicle 100 enters the ON state for the first time after the current time. An example of a process for calculating the estimated departure time executed by the estimated departure time obtainment unit 361 is a technique disclosed in Japanese Laid-Open Patent Publication No. 2013-233013.

The controller 360 includes an information obtainment unit 362 that obtains frost formation information, which is information about formation of frost on the windowpanes of the vehicle 100. The frost formation information includes forecasted values of the ambient temperature and humidity at the estimated departure time at the current position of the vehicle 100.

The controller 360 includes a frost formation rate calculator 364 that calculates a frost formation rate of the windowpanes at the estimated departure time based on the frost formation information and the estimated departure time. The frost formation rate is an amount of frost formed on a windowpane at the estimated departure time. The frost formation rate calculator 364 calculates a frost formation level of multiple stages corresponding to the frost formation amount to calculate the frost formation rate. The frost formation level is lowest when no frost is formed and increases as the frost formation amount increases. The frost formation rate calculator 364 calculates the frost formation level of each of the front window and the rear window of the vehicle 100.

The controller 360 includes an operation period calculator 366 that calculates a necessary operation period of the defrosters for removing frost from the windowpanes when it is assumed that frost corresponding to the frost formation level calculated by the frost formation rate calculator 364 is formed on the windowpanes of the vehicle 100. The operation period calculator 366 calculates the operation period of the front defroster R1 in accordance with the frost formation level of the front window of the vehicle 100. The operation period calculator 366 also calculates the operation period of the rear defroster R2 in accordance with the frost formation level of the rear window of the vehicle 100.

The controller 360 includes an operation start time determination unit 368 that determines the activation time of the defrosters for the pre-defrosting. The operation start time determination unit 368 determines the activation time based on the estimated departure time calculated by the estimated departure time obtainment unit 361 and the operation period of the defrosters calculated by the operation period calculator 366. The operation start time determination unit 368 determines the activation time of each of the front defroster R1 and the rear defroster R2.

The controller 360 includes a defrosting controller 370 that outputs operation request signals for requesting operation of the defrosters so that the defrosters start to operate at the activation times. The defrosting controller 370 outputs the operation request signal for each of the front defroster R1 and the rear defroster R2. More specifically, the defrosting controller 370 transmits a defroster operation request signal to the control module 110 of the vehicle 100 so that the air conditioner 170 operates with the defrosting mode activated. The defrosting controller 370 also transmits a defogger operation request signal to the control module 110 of the vehicle 100 so that the defogger 180 operates. When the controller 130 of the control module 110 of the vehicle 100 receives a defroster operation request signal, the controller 130 of the control module 110 inputs the defroster operation request signal to the air-conditioning ECU 160a. The air-conditioning ECU 160a drives the air conditioner 170 with the defrosting mode activated. When the controller 130 of the control module 110 of the vehicle 100 receives a defogger operation request signal, the controller 130 of the control module 110 inputs the defogger operation request signal to the defogger ECU 160b. The defogger ECU 160b drives the defogger 180.

The controller 360 includes a defrosting confirmation unit 372 that transmits defrosting information including the frost formation level calculated by the frost formation rate calculator 364 and the activation time determined by the operation start time determination unit 368 to the operating terminal 200. The controller 360 further includes an operation determination unit 374 that determines whether the defrosting controller 370 outputs the operation request signal based on information output from the operating terminal 200 in response to the defrosting information.

The controller 130, such as a computer, runs programs stored in the controller 360 to implement each of the processes executed by the estimated departure time obtainment unit 361, the information obtainment unit 362, the frost formation rate calculator 364, the operation period calculator 366, the operation start time determination unit 368, the defrosting controller 370, the defrosting confirmation unit 372, and the operation determination unit 374.

Figure 2:
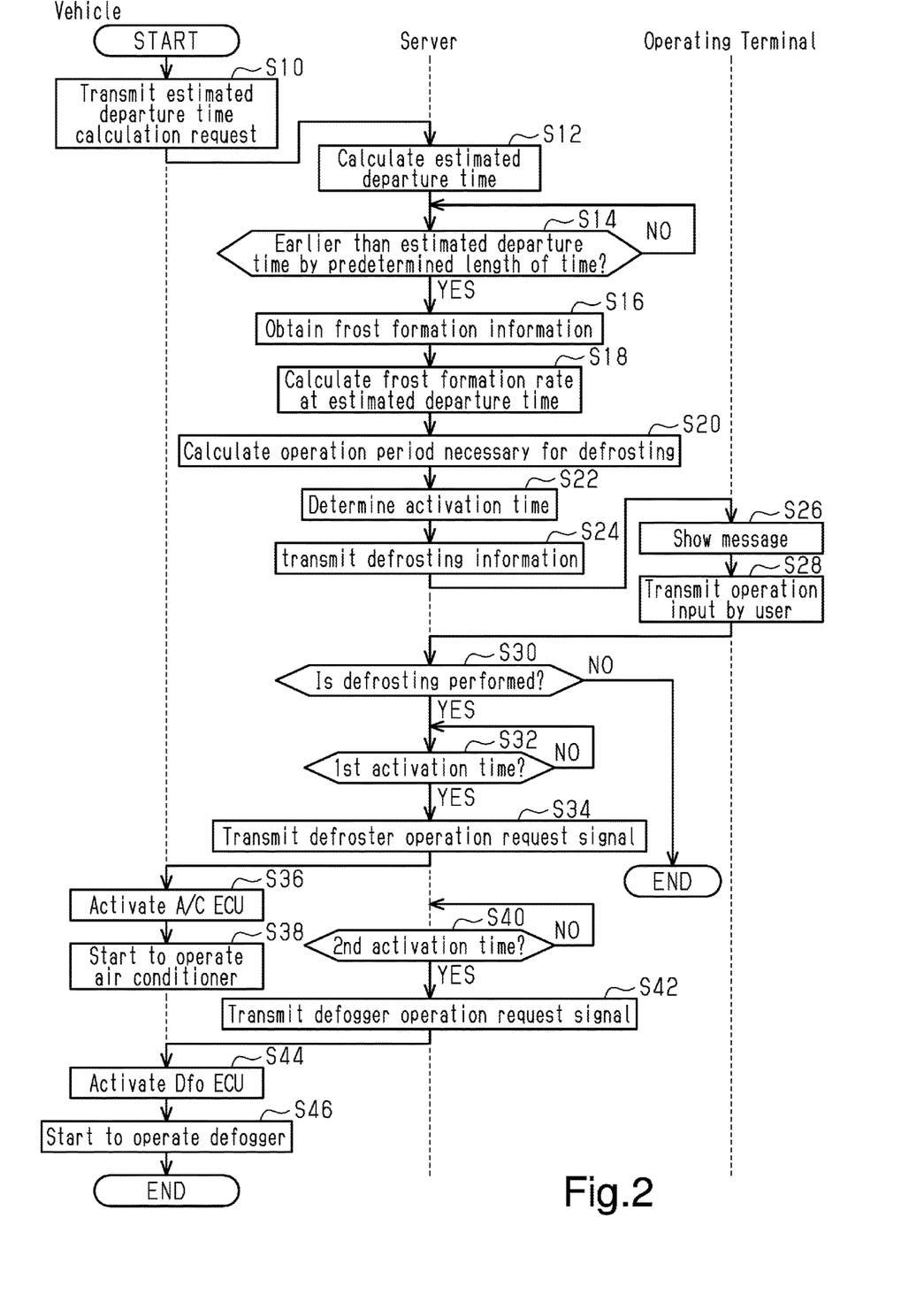
FIG. 2 is a flowchart showing a pre-defrosting process.

The pre-defrosting process will now be described with reference to FIG. 2.

When the start switch 191 is pushed so that the vehicle 100 is switched to the OFF state, the controller 130 of the control module 110 starts to control the pre-defrosting.

In step S10, the controller 130 of the control module 110 transmits a signal indicating an estimated departure time calculation request to the server 300. Subsequently, the power supplied to the ECUs 160 of the vehicle 100 is cut off. More specifically, the vehicle 100 enters the OFF state. The power supplied to the control module 110 is also cut off. However, the control module 110 enters a standby state that allows reception of information from the server 300.

When the estimated departure time calculation request is input to the server 300, the controller 360 of the server 300 executes step S12. In step S12, the estimated departure time obtainment unit 361 of the controller 360 calculates an estimated departure time of the vehicle 100 based on the vehicle information and the user information. Then, the controller 360 of the server 300 proceeds to step S14.

In step S14, the controller 360 of the server 300 determines whether the current time is earlier than the estimated departure time, calculated by the estimated departure time obtainment unit 361, by a predetermined length of time. The predetermined length of time is set to be greater than the necessary operation period of the defrosters for removing frost from the windowpanes when the frost formation level of the windowpanes is the highest of the multiple frost formation levels. In the present embodiment, the predetermined length of time is one hour. If it is determined that the current time has not reached the time earlier than the estimated departure time by the predetermined length of time (step S14: NO), the controller 360 again executes step S14. That is, the controller 360 repeats step S14 until the current time reaches the time earlier than the estimated departure time by the predetermined length of time. If it is determined that the current time has reached the time earlier than the estimated departure time by the predetermined length of time (step S14: YES), the controller 360 proceeds to step S16.

In step S16, the information obtainment unit 362 of the controller 360 of the server 300 obtains frost formation information at the estimated departure time calculated by the estimated departure time obtainment unit 361. More specifically, the information obtainment unit 362 obtains the estimated departure time calculated by the estimated departure time obtainment unit 361 and the current position of the vehicle 100 stored in the database 340. The current position of the vehicle 100 is the latest one of the current positions transmitted from the vehicle 100, which output the estimated departure time calculation request. The information obtainment unit 362 obtains forecasted values of the ambient temperature and humidity at the current position of the vehicle 100 at the estimated departure time from the meteorological information memory 350. The controller 360 of the server 300 proceeds to step S18.

In step S18, the frost formation rate calculator 364 of the controller 360 of the server 300 calculates the frost formation rate of the front window of the vehicle 100 at the estimated departure time calculated by the estimated departure time obtainment unit 361. The frost formation rate calculator 364 stores a first frost formation map showing the relationship of the ambient temperature and humidity with the frost formation level of the front window. The first frost formation map is created in advance based on, for example, simulations or tests in accordance with the inclination and area of the front window attached to the vehicle. The first frost formation map is created for each vehicle type. The frost formation rate calculator 364 refers to the first frost formation map corresponding to the type of the vehicle 100 to calculate the frost formation level corresponding to the forecasted values of the ambient temperature and humidity at the estimated departure time calculated in step S16.

In step S18, the frost formation rate calculator 364 also calculates the frost formation rate of the rear window of the vehicle 100 at the estimated departure time calculated by the estimated departure time obtainment unit 361. The frost formation rate calculator 364 stores a second frost formation map showing the relationship of the ambient temperature and humidity with the frost formation level of the rear window. The second frost formation map is created in advance based on, for example, simulations or tests in accordance with the inclination and area of the rear window attached to the vehicle. The second frost formation map is created for each vehicle type. The frost formation rate calculator 364 refers to the second frost formation map corresponding to the type of the vehicle 100 to calculate the frost formation level corresponding to the forecasted values of the ambient temperature and humidity at the estimated departure time point calculated in step S16. When the frost formation rate calculator 364 calculates the frost formation levels of the front window and the rear window, the controller 360 of the server 300 proceeds to step S20.

In step S20, the operation period calculator 366 of the controller 360 of the server 300 calculates the operation period of the front defroster R1. More specifically, the operation period calculator 366 calculates a first operation period that is an operation period of the air conditioner 170 necessary for defrosting the front window. The operation period calculator 366 stores a first operation period map that specifies the operation period of the air conditioner 170 necessary for removing frost, if formed on the front window, from the front window with the defroster mode activated for each frost formation level. The first operation period map is created in advance based on, for example, simulations or tests in accordance with the type of the air conditioner installed on the vehicle and the defrosting properties of the defroster mode. The first operation period map is created for each vehicle type. The frost formation rate calculator 364 refers to the first operation period map corresponding to the type of the vehicle 100 to calculate the first operation period necessary for removing the frost of the frost formation level, which is calculated by the frost formation rate calculator 364, from the front window.

In step S20, the operation period calculator 366 also calculates the operation period of the rear defroster R2. More specifically, the operation period calculator 366 calculates a second operation period that is an operation period of the defogger 180 necessary for defrosting the rear window. The operation period calculator 366 stores a second operation period map that specifies the operation period of the defogger 180 necessary for removing frost, if formed on the rear window, from the rear window for each frost formation level. The second operation period map is created in advance based on, for example, simulations or tests in accordance with the heating properties of the defogger installed on the vehicle. The second operation period map is created for each vehicle type. The frost formation rate calculator 364 refers to the second operation period map corresponding to the type of the vehicle 100 to calculate the second operation period necessary for removing the frost of the frost formation level, which is calculated by the frost formation rate calculator 364, from the rear window. When the operation period calculator 366 calculates the first operation period and the second operation period, the controller 360 of the server 300 proceeds to step S22. In the present embodiment, the frost formation level of the rear window is less than the frost formation level of the front window due to the inclination of each of the front window and the rear window. Also, the defrosting property of the defogger 180 using electric heating is greater than the defrosting property of the air conditioner 170 using warm air. Thus, the second operation period is less than the first operation period.

In step S22, the operation start time determination unit 368 of the controller 360 of the server 300 determines the activation time of the defrosters for the pre-defrosting. The operation start time determination unit 368 determines the activation time of the front defroster R1. More specifically, the operation start time determination unit 368 determines that the activation time of the air conditioner 170, or a first activation time, is the time earlier than the estimated departure time, calculated by the estimated departure time obtainment unit 361, by the first operation period. The operation start time determination unit 368 also determines the activation time of the rear defroster R2. More specifically, the operation start time determination unit 368 determines that the activation time of the defogger 180, or a second activation time, is the time earlier than the estimated departure time, calculated by the estimated departure time obtainment unit 361, by the second operation period. As described above, the second operation period is less than the first operation period. Thus, the second activation time is closer to the current time than the first activation time. The controller 360 of the server 300 proceeds to step S24.

In step S24, the defrosting confirmation unit 372 of the controller 360 of the server 300 transmits the defrosting information to the operating terminal. The defrosting information includes the frost formation levels of the front window and the rear window calculated by the frost formation rate calculator 364, the first activation time and the second activation time determined by the operation start time determination unit 368, and the estimated departure time calculated by the estimated departure time obtainment unit 361.

When the operating terminal 200 receives the defrosting information from the server 300, the controller 220 of the operating terminal 200 executes step S26. In step S26, the controller 220 of the operating terminal 200 shows, on the display 230, the defrosting information and a message asking the user of the vehicle 100 whether to perform the pre-defrosting by the estimated departure time. The controller 220 of the operating terminal 200 proceeds to step S28.

In step S28, the controller 220 of the operating terminal 200 transmits an operating instruction input by the user to the server 300. More specifically, when the operating portion 240 is operated so that the pre-defrosting is performed, the controller 220 of the operating terminal 200 transmits a signal indicating that the pre-defrosting is to be performed. When the operating portion 240 is operated so that the pre-defrosting is not performed, the controller 220 of the operating terminal 200 transmits a signal indicating that the pre-defrosting is not to be performed. In addition, when the operating portion 240 is not operated in a predetermined length of time (e.g., ten minutes), the controller 220 of the operating terminal 200 transmits a signal indicating that the operating portion 240 is not operated.

When the server 300 receives the signal from the operating terminal 200, the controller 360 of the server 300 proceeds to step S30. In step S30, in the controller 360 of the server 300, the operation determination unit 374 determines whether to perform the pre-defrosting. More specifically, if it is determined that the server 300 receives a signal indicating that the pre-defrosting is performed, the operation determination unit 374 determines that the pre-defrosting is to be performed. If it is determined that the server 300 receives a signal indicating that the pre-defrosting is not performed or a signal indicating that the operating portion 240 is not operated, the operation determination unit 374 determines that the pre-defrosting is not to be performed. In step S30, if it is determined that the pre-defrosting is not to be performed (S30: NO), the controller 360 of the server 300 ends the control of the pre-defrosting. In step S30, if it is determined that the pre-defrosting is to be performed (S30: YES), the controller 360 of the server 300 proceeds to step S32.

In step S32, the defrosting controller 370 of the controller 360 of the server 300 determines whether the current time reaches the first activation time. If it is determined that the current time has not reached the first activation time (step S32: NO), the defrosting controller 370 again executes step S32. More specifically, the defrosting controller 370 repeats step S32 until the current time reaches the first activation time. If it is determined that the current time has reached the first activation time (step S32: YES), the defrosting controller 370 proceeds to step S34. In step S34, the defrosting controller 370 transmits the defroster operation request signal to the control module 110 of the vehicle 100.

When the control module 110 of the vehicle 100 receives the defroster operation request signal, the controller 130 of the control module 110 executes step S36. In step S36, the controller 130 of the control module 110 performs control so that the controller 130 and the air-conditioning ECU 160a are supplied with power from a battery (not shown). This activates the controller 130 from the standby state and also activates the air conditioning ECU 160a. The controller 130 of the control module 110 proceeds to step S38.

In step S38, the controller 130 of the control module 110 causes the air conditioning ECU 160a to drive the air conditioner 170 with the defroster mode activated. More specifically, the air conditioner 170 blows warm air onto the interior surface of the front window.

After outputting the defroster operation request signal, the defrosting controller 370 of the controller 360 of the server 300 proceeds to step S40. In step S40, the defrosting controller 370 determines whether the current time has reached the second activation time. If it is determined that the current time has not reached the second activation time (step S40: NO), the defrosting controller 370 again executes step S40. More specifically, the defrosting controller 370 repeats step S40 until the current time reaches the second activation time. If it is determined that the current time has reached the second activation time (step S40: YES), the defrosting controller 370 proceeds to step S42. In step S42, the defrosting controller 370 transmits the defogger operation request signal to the control module 110 of the vehicle 100.

When the control module 110 of the vehicle 100 receives the defogger operation request signal, the controller 130 of the control module 110 executes step S44. In step S44, the controller 130 of the control module 110 performs control so that the defogger ECU 160b is supplied with power from a battery (not shown). This activates the defogger ECU 160b. The controller 130 of the control module 110 proceeds to step S46.

In step S46, the controller 130 of the control module 110 causes the defogger ECU 160b to drive the defogger 180 so that power is supplied to the electric heating wires of the rear window. The above-described processes end a series of the pre-defrosting processes.

The operation and advantages of the present embodiment will now be described.

(1) In the configuration described above, when performing the pre-defrosting, the following process is executed. The process in step S18 calculates the frost formation levels of the windowpanes at the estimated departure time based on the forecasted values of the ambient temperature and humidity at the estimated departure time. The process in step S20 calculates the first operation period and the second operation period, which are the operation periods of the defrosters needed to remove frost of the frost formation levels calculated in step S18. The processes in steps S34 and S42 start to operate the air conditioner 170 and the defogger 180 at the activation times obtained by subtracting the first and second operation periods from the estimated departure time, respectively. As described above, in the configuration described above, after the frost formation levels of the windowpanes are calculated, the defrosters operate for the operation period corresponding to the frost formation levels. This eliminates unnecessary operation of the defrosters and reduces power consumption.

(2) In a configuration differing from the above-described configuration, the controller 130 of the control module 110 of the vehicle 100 may include an information obtainment unit and a frost formation rate calculator so that the control module 110 obtains the frost formation information and calculates the frost formation level. In such a configuration, the control module 110 has to activate the controller 130 during the processes for obtaining the frost formation information and calculating the frost formation level. Accordingly, power consumption increases.

In this regard, in the above-described configuration, the controller 360 of the server 300 includes all of the processors that calculate various kinds of information used to perform the pre-defrosting. More specifically, the controller 360 of the server 300 includes all of the estimated departure time obtainment unit 361, the information obtainment unit 362, the frost formation rate calculator 364, the operation period calculator 366, the operation start time determination unit 368, the defrosting controller 370, the defrosting confirmation unit 372, and the operation determination unit 374. The server 300 executes all of the processes starting from the calculation of the estimated departure time of the vehicle 100 to the outputting of a defroster operation request signal and a defogger operation request signal. Thus, the vehicle 100 does not need to execute any process until the operation request signal is received from the server 300 and the defrosters start to operate. This eliminates the need for activating the various controllers in the vehicle 100. In the vehicle 100, the supply of power to the various controllers of the vehicle is stopped until the operation request signal is received from the server 300. This reduces power consumption.

(3) The vehicle 100 may not depart at the estimated departure time calculated by the estimated departure time obtainment unit 361. The frost formation level may be relatively low so that the pre-defrosting does not need to be performed. If the pre-defrosting is performed in such cases, unnecessary power is consumed.

In this regard, with the above-described configuration, in steps S24 to S30, the defrosting information is transmitted to the operating terminal 200 so that the defrosting information is shown on the display 230 of the operating terminal 200 to allow the user to select whether to perform the pre-defrosting is performed. Thus, unnecessary operation of the defrosters is avoided when the defrosters do not need to operate. In the above-described configuration, the defrosting information includes the frost formation level. This allows the user to determine the necessity of the pre-defrosting in accordance with the frost formation level.

(4) In the above-described configuration, values of the ambient temperature and humidity, which are meteorological parameters strongly related to frost formation, expected at the estimated departure time are used as the frost formation information. The frost formation levels are calculated based on the frost formation information. Thus, the frost formation levels of the windowpanes of the vehicle 100 at the estimated departure time are appropriately calculated.

(5) In the above-described configuration, the control module 110 of the vehicle 100 is connected to the server 300, which stores information on the vehicle 100, through the external communication network 400. The control module 110 includes the transmitter transmitting the coordinates of the current position of the vehicle 100 to the server 300 and the receiver receiving the operation request signal for starting to operate the defrosters at the activation times calculated based on the coordinates of the current position.

The coordinates of the current position of the vehicle 100, which are information on the vehicle 100, are output to be stored in the server 300. The server 300 specifies the coordinates of the current position of the vehicle 100. The server 300 calculates the frost formation rates of the windowpanes based on the coordinates of the current position of the vehicle 100. The current position of the vehicle 100 may need to be specified, for example, to calculate the frost formation rates of the windowpanes using the frost formation information such as the ambient temperature and humidity at the current position of the vehicle 100. The server 300 uses the frost formation information related to the current position. This increases the accuracy of calculating the frost formation rates of the windowpanes. As a result, the server 300 accurately determines the activation times of the defrosters. When receiving the operation request signals for starting to operate the defrosters at the activation times, the vehicle 100 operates the defrosters. This reduces power consumption.

(6) In the above-described configuration, the control module 110 of the vehicle 100 is connected to the server 300, which stores information on the vehicle 100, through the external communication network 400. The control module 110 includes the transmitter transmitting images of the windowpanes captured by a camera capturing images of the windowpanes of the vehicle 100 to the server 300 and the receiver receiving the operation request signals for starting to operate the defrosters at the activation times calculated based on the images of the windowpanes.

The images of the windowpanes, which are information on the vehicle 100, are output to be stored in the server 300. The server 300 calculates the frost formation rates of the windowpanes using the images showing the actual state of the windowpanes. As a result, the server 300 accurately determines the activation times of the defrosters. When receiving the operation request signals for starting to operate the defrosters at the activation times, the vehicle 100 operates the defrosters. This reduces power consumption.

The present embodiment may be modified as follows. The present embodiment and the following modified examples may be combined as long as the combined modified examples remain technically consistent with each other.

The pre-defrosting process may include a process that stops operation of the air conditioner 170 and the defogger 180 at a point in time when the estimated departure time is reached. With such a configuration, even if the user does not enter the vehicle 100 at the estimated departure time, operation of the defrosters automatically stops. Thus, unnecessary power consumption is avoided.

The predetermined length of time, which specifies the standby period in step S14, is not limited to that of the embodiment described above. The predetermined length of time may be greater than the necessary operation period of each defroster for removing frost from the windowpane when the frost formation level of the windowpane is the highest of the multiple frost formation levels. When the predetermined length of time is set as described above, it is ensured that the operation period of the defroster actually operated for the pre-defrosting is sufficient to remove frost of the calculated frost formation level by the estimated departure time.

In the procedures of the pre-defrosting process, the standby process, or step S14, may be executed between step S16 and step S24 instead of between step S12 and step S16. For example, step S14 may be executed between step S22 and step S24. In this configuration, before the first activation time and the second activation time, step S24 is executed to transmit the defrosting information to the operating terminal 200.

Step S14 may be omitted.

The pre-defrosting process may be changed so that after the first activation time is calculated in step S22, step S24 is executed at a point in time earlier than the first activation time by a specified length of time (e.g., fifteen minutes). More specifically, the defrosting information is transmitted to the operating terminal 200 at the time earlier than the first activation time by the specified length of time. When the pre-defrosting process is changed as described above, after step S22, a standby period is ensured until the current time reaches the time earlier than the first activation time by the specified length of time. Subsequently, step S24 is executed. If the specified length of time is set to a reasonable length of time, the timing of showing a message asking whether to perform the pre-defrosting on the operating terminal 200 may be appropriate to the activation times of the defrosters.

In steps S24 and S26, information on the frost formation level of the rear window and the second activation time may be omitted from the defrosting information. More specifically, the frost formation information may include information on only frost formation of the front window, which is likely to have a high frost formation level. Even when the information on the frost formation level of the rear window and the second activation time is omitted from the defrosting information, the defrosting information is a reasonable material for the user to determine the necessity of the pre-defrosting.

The embodiment may be changed so that in the pre-defrosting process, only one of the front window and the rear window is selected to undergo the defrosting. In this case, in step S26, the display 230 may show a message asking whether to remove frost from both or only one of the front window and the rear window, and a signal indicating the selected result may be transmitted from the operating terminal in step S28. In step S30, the windowpane from which frost is removed may be determined in accordance with the signal from the operating terminal 200.

The frost formation level of the rear window is not necessarily less than the frost formation level of the front window. The frost formation level of the rear window may be greater than the frost formation level of the front window depending on the meteorological environment of the vehicle or the state of the vehicle when stopped. When reflecting such circumstances, the second operation period may be greater than the first operation period. In this case, the second activation time is closer to the current time than the first activation time. Taking such a case into consideration, the procedures of the pre-defrosting process may be changed from that of the embodiment. More specifically, the procedures of the pre-defrosting process in the embodiment may be changed so that the operation request signal is transmitted to the defroster that is requested to operate in an order from the earlier one of the first activation time and the second activation time. When the current time reaches the activation time of each of the air conditioner 170 and the defogger 180, the respective defrosters start to operate.

After step S34, step S32 may be executed in the control module 110 of the vehicle 100. More specifically, if it is determined in step S30 that the pre-defrosting is performed, the defrosting controller 370 of the server 300 executes step S34 to transmit a defrosting request signal to the control module 110 of the vehicle 100 without waiting until the first activation time. When receiving the defrosting request signal, the controller 130 of the control module 110 waits until the first activation time while holding the defrost request signal in a standby state. More specifically, the controller 130 of the control module 110 executes a process corresponding to step S32. When the current time reaches the first activation time, the controller 130 of the control module 110 executes step S36 to activate the controller 130 from the standby state and also activate the air-conditioning ECU 160a. Subsequently, in step S38, the air conditioner 170 is driven. With such a configuration, the air conditioner 170 is driven at the first activation time.

In the same manner as the above-described modified example, after step S42, step S40 may be executed in the control module 110 of the vehicle 100. More specifically, when receiving the defogger operation request signal, the controller 130 of the control module 110 of the vehicle 100 waits until the second activation time while maintaining the defogger operation request signal in the standby state. When the current time reaches the second activation time, the defogger ECU 160b is driven in step S44, and the defogger 180 is drive in step S46.

The frost formation information is not limited to that of the embodiment described above. For example, images of the windowpanes captured at a point in time when the frost formation rate calculator 364 calculates the frost formation rates may be used as the frost formation information. In this case, a camera monitoring the windowpanes is installed on the vehicle. The camera is activated for a period from before to after the frost formation rate calculator 364 calculates the frost formation rates. The controller 130 of the control module 110 transmits images captured by the camera to the server 300 so that the images are stored in the database 340. When the camera is activated during only the period from before to after the frost formation rate calculator 364 calculates the frost formation rates, unnecessary power consumption is avoided. An example of the camera monitoring the windowpanes is a camera of a driving recorder.

When images of the windowpanes are used as the frost formation information, the frost formation rate calculator 364 may calculate the frost formation rates, for example, as follows. The frost formation rate calculator 364 prestores typical images of the windowpanes corresponding to each frost formation level extracted from previous data. The frost formation rate calculator 364 compares an image captured at a point in time of calculating the frost formation rate with the prepared images to determine the closest image and select the frost formation level of the image. The frost formation rate calculator 364 uses the selected frost formation level as the level of frost estimated to be formed on the windowpanes at the estimated departure time. In the embodiment, the frost formation rates are calculated one hour earlier than the estimated departure time. That is, it is assumed that the frost formation level subtly changes between the estimated departure time and the time at which the frost formation rates are calculated. Thus, as described above, the frost formation level at a point in time of calculating the frost formation rates may be used as the frost formation level at the estimated departure time. The operation periods are calculated based on the actual frost formation levels of the windowpanes, which are calculated as described above, so that appropriate operation periods of the defrosters are calculated.

As described in this modified example, the frost formation rate calculator 364 does not necessarily have to calculate the frost formation rates at the estimated departure time and may calculate frost formation rates at a time assumed to be equivalent to the frost formation rates obtained at the estimated departure time. When images of the windowpanes are used as the frost formation information as described above, it is considered that the difference in time between the time at which the images are captured by the camera and the estimated departure time is assumed to subtly change the frost formation levels of the windowpanes. More specifically, the time at which the camera captures images is determined based on the estimated departure time. As described above, the frost formation rate calculator 364 calculates the frost formation rates based on the estimated departure time and the images of the windowpanes as the frost formation information.

As the frost formation information, the frost formation rate calculator 364 may use information on an operation state of a defroster installed in another vehicle located in a predetermined range from the current position of the vehicle 100 at a point in time of calculating the frost formation rates. In this case, operation states of defrosters installed on the vehicles are transmitted from each vehicle to the server 300 and stored in the database 340. The predetermined range may be a range in which meteorological parameters related to frost formation such as the ambient temperature and humidity are assumed to be substantially uniform.

When the operation states of the defrosters of other vehicles are used as the frost formation information, the frost formation rate calculator 364 may calculate the frost formation rate, for example, as follows. The frost formation rate calculator 364 prestores a map showing the relationship between the frost formation level and the proportion of vehicles that are operating the defrosters and located in the predetermined range from the current position of the vehicle 100. At a point in time of calculating the frost formation rates, the frost formation rate calculator 364 calculates, among the vehicles located in the predetermined range from the current position of the vehicle 100, the proportion of vehicles that are operating the defrosters to obtain the frost formation level corresponding to the proportion from the map. In the same manner as when images captured by the camera are used as the frost formation information, the frost formation rate calculator 364 uses the obtained frost formation level as the frost formation level of frost estimated to be formed on the windowpanes at the estimated departure time. The operation periods of the defrosters are calculated based on the frost formation rates reflecting the state of frost formation on surrounding vehicles so that appropriate operation periods are calculated.

The frost formation information may be other than forecasted values of the ambient temperature and humidity, images of the windowpanes, and an operation state of a defroster of another vehicle. The frost formation information may be any information that allows for calculation of the amount of frost formed on a windowpane at the estimated departure time such as a frost formation rate at the estimated departure time or a frost formation rate at a time assumed to be equivalent to the frost formation rate at the estimated departure time based on the frost formation information and the estimated departure time. For example, the vehicle 100 may include an ambient temperature sensor, and a detection value of the ambient temperature sensor at a point in time of calculating a frost formation rate may be used as the frost formation information. When a map showing the relationship between the ambient temperature and the frost formation level is created in advance, the frost formation rate may be calculated from the detection value of the ambient temperature sensor.

The frost formation information may include a combination of different kinds of information. For example, some or all of the forecasted values of the ambient temperature and humidity, the images of the windowpanes, and operation information of a defroster of another vehicle may be combined to calculate the frost formation rates at the estimated departure time.

The defrosting confirmation unit 372 and the operation determination unit 374 are not necessary. That is, the defrosting confirmation unit 372 and the operation determination unit 374 may be omitted, and steps S24 to S30 may be omitted. When steps S24 to S30 are omitted, pre-defrosting is certain to be executed if frost is formed on the windowpanes. If the user knows that the vehicle 100 will depart at the estimated departure time and wishes to eliminate the task of selecting whether to permit or reject the pre-defrosting with the operating terminal 200, the omission of the defrosting confirmation unit 372 and the operation determination unit 374 is effective. When the defrosting confirmation unit 372 and the operation determination unit 374 are omitted, the user does not select whether to permit or reject the pre-defrosting. Thus, the user may not notice that the pre-defrosting is performed. Taking such a circumstance into consideration, when the defrosting confirmation unit 372 and the operation determination unit 374 are omitted, the pre-defrosting process may be changed so that operation of the defrosters will be stopped at the estimated departure time.

Instead of allowing the user to select whether to permit or reject the pre-defrosting through steps S24 to S30, the user may be allowed to select a state of the pre-defrosting for using the vehicle 100 next time, for example, before switching the vehicle 100 to the OFF state. For example, before the vehicle 100 is switched to the OFF state, a message asking the user whether to perform the pre-defrosting may be shown on the display 230 of the operating terminal 200 or an on-board display of the vehicle 100. Whether step S10 is executed or not is selected in accordance with an operation instruction input by the user in response to the message. More specifically, when the user inputs an operation instruction indicating that the pre-defrosting is to be performed, the estimated departure time calculation request is transmitted. When the user inputs an operation instruction indicating that the pre-defrosting is not to be performed, the estimated departure time calculation request is not transmitted. At the point in time when the estimated departure time calculation request is not transmitted, the control of the pre-defrosting is ended.

The process for calculating the estimated departure time of the vehicle 100 with the estimated departure time obtainment unit 361 is not limited to that of the embodiment described above. For example, whether the vehicle 100 is moving may be determined based on data of the coordinates of the current position detected by the GPS 140 of the vehicle 100. Statistics may be obtained based on assumption that when the vehicle 100 starts to move, the vehicle 100 departs, and the departure time of the vehicle 100 may be estimated.

The process for calculating the estimated departure time of the vehicle 100 with the estimated departure time obtainment unit 361 may use information from the operating terminal 200. For example, an acceleration is measured by the acceleration sensor 270 of the operating terminal 200 and input to the controller 220 of the operating terminal 200. The controller 220 determines that the acceleration is greater than a predetermined threshold value. The threshold value may be set to an acceleration that is obtained when the user performs an action expected before departure such as brushing teeth, changing clothes, cooking, or exercising. The controller 220 transmits a signal indicating the time at which the acceleration is increased to the server 300. In addition, the database 340 of the server 300 stores the frequency and the times of increases in the acceleration of the user. The estimated departure time obtainment unit 361 may assume that the vehicle 100 will depart after a fixed amount of time from when the acceleration is increased. In this case, it may be assumed that the time from when the user performs an action expected before departure to when the user enters the vehicle 100 and starts the vehicle 100 is substantially fixed. Thus, the departure time of the vehicle 100 may be calculated as described above.

The estimated departure time of the vehicle 100 may be calculated based on data of the coordinates of the current position of the vehicle 100 detected by the GPS 140 of the vehicle 100 and data of the coordinates of the current position of the operating terminal 200 detected by the GPS 260 of the operating terminal 200. In this case, in the same manner as the GPS 140 of the vehicle 100, the GPS 260 of the operating terminal 200 outputs data on the coordinates of the current position of the operating terminal 200 at regular intervals. In addition, the database 340 of the server 300 stores data on the coordinates of the current position of the vehicle 100 and data on the coordinates of the current position of the operating terminal 200. The estimated departure time obtainment unit 361 of the server 300 detects times at which the coordinates of the current position of the vehicle 100 become equal to the coordinates of the current position of the operating terminal 200 from a state in which the coordinates differ from each other and obtains statistics about the times and the frequency of the times. From the statistics, the estimated departure time obtainment unit 361 may calculate that a time at which the coordinates of the current position of the vehicle 100 become equal to the coordinates of the current position of the operating terminal 200 from a state in which the coordinates differ from each other is the estimated departure time of the vehicle 100.

For example, when the user inputs schedule information to the memory 250 of the operating terminal 200 and the schedule information includes a planned departure time input by the user, the estimated departure time obtainment unit 361 may obtain the planned departure time.

The estimated departure time obtainment unit 361, the information obtainment unit 362, the frost formation rate calculator 364, the operation period calculator 366, the operation start time determination unit 368, and the defrosting controller 370 may be included in any of the controller 360 of the server 300, the controller 130 of the control module 110 of the vehicle 100, and the controller 220 of the operating terminal 200. The pre-defrosting process may be executed without difficulty when information is configured to be retrieved from the database 340 of the server 300 and the meteorological information memory 350 in response to a request from the controller 130 of the control module 110 or the controller 220 of the operating terminal 200 and the three controllers are configured so that information calculated by one of the controllers is exchanged with the other controllers. The control module 110 of the vehicle 100 may store meteorological information distributed from the meteorological service center 500 and vehicle information such as a time at which the vehicle 100, on which the control module 110 is installed, is switched to the ON state and the coordinates of the current position of the vehicle 100. The memory 250 of the operating terminal 200 of the user may store vehicle information on the vehicle 100 of the user and meteorological information distributed from the meteorological service center 500. When the stored information is only information on the vehicle 100 of the user and the meteorological information, the stored amount will not be excessive.

Figure 3:
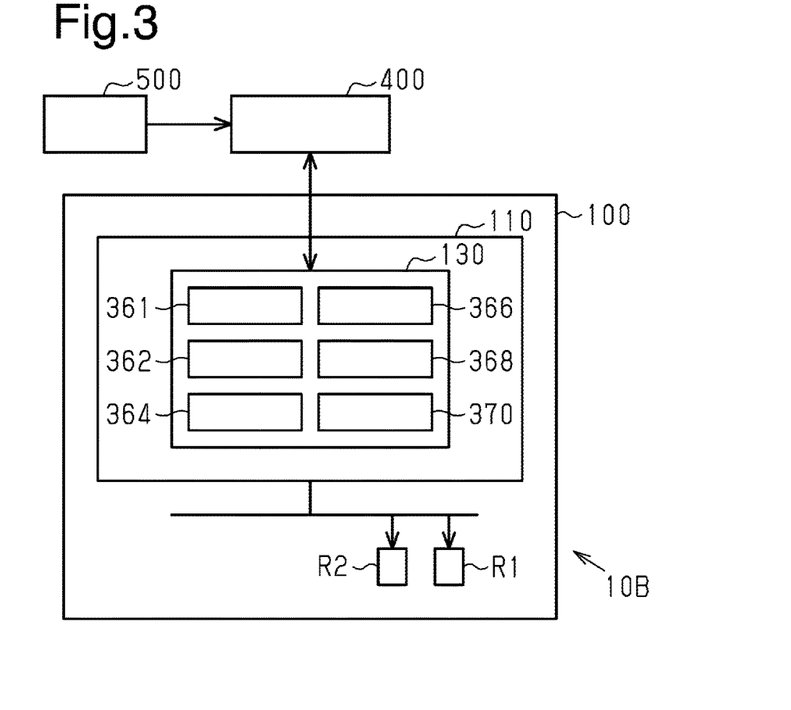
FIG. 3 is a schematic diagram showing a modified example of a configuration of a defrosting control system.

The estimated departure time obtainment unit 361, the information obtainment unit 362, the frost formation rate calculator 364, the operation period calculator 366, the operation start time determination unit 368, and the defrosting controller 370 may be included in any subject. For example, as shown in FIG. 3, the controller 130 of the control module 110 of the vehicle 100 may include all of the estimated departure time obtainment unit 361, the information obtainment unit 362, the frost formation rate calculator 364, the operation period calculator 366, the operation start time determination unit 368, and the defrosting controller 370. In this case, the control module 110 of the vehicle 100 configures a defrosting control system 10B. In this case, the controller 130 of the control module 110 of the vehicle 100 stores programs of the processes executed by each functional unit described above.

Figure 4:
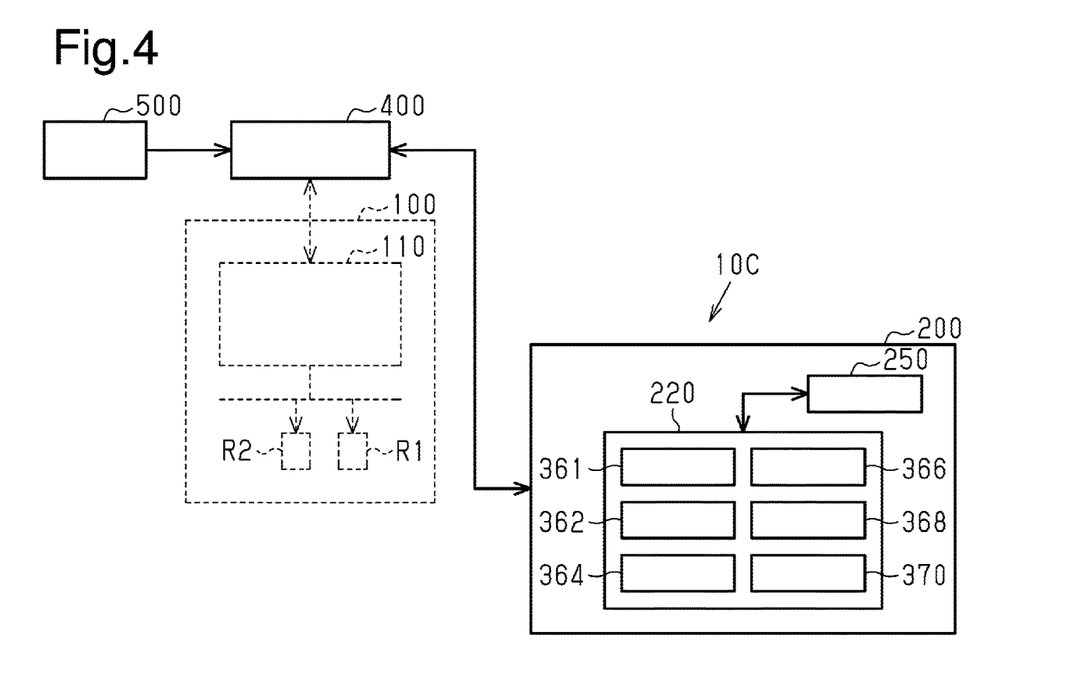
FIG. 4 is a schematic diagram showing a modified example of a configuration of a defrosting control system.

As shown in FIG. 4, the controller 220 of the operating terminal 200 may include all of the estimated departure time obtainment unit 361, the information obtainment unit 362, the frost formation rate calculator 364, the operation period calculator 366, the operation start time determination unit 368, and the defrosting controller 370. In this case, the operating terminal 200 configures a defrosting control system 10C. In this case, the controller 220 of the operating terminal 200 and the memory 250 store programs of the processes executed by each functional unit described above.

Figure 5:
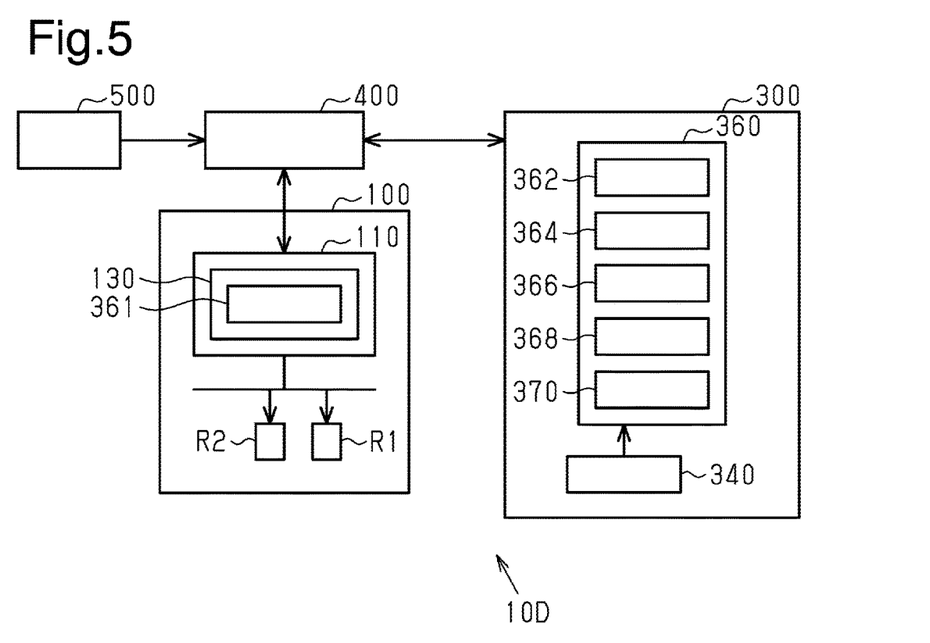
FIG. 5 is a schematic diagram showing a modified example of a configuration of a defrosting control system.

The controller 130 of the control module 110 of the vehicle 100 may include one or more of the functional units, and the controller 360 of the server 300 may include the remaining functional units. For example, as shown in FIG. 5, the controller 130 of the control module 110 of the vehicle 100 may include the estimated departure time obtainment unit 361, and the controller 360 of the server 300 may include the information obtainment unit 362, the frost formation rate calculator 364, the operation period calculator 366, the operation start time determination unit 368, and the defrosting controller 370. In this case, the control module 110 of the vehicle 100 and the server 300 configures a defrosting control system 10D. In this case, the controller 130 of the control module 110 stores programs executed by the estimated departure time obtainment unit 361 included in the controller 130 of the control module 110 of the vehicle 100. The controller 360 of the server 300 stores programs of the processes executed by the information obtainment unit 362, the frost formation rate calculator 364, the operation period calculator 366, the operation start time determination unit 368, and the defrosting controller 370 included in the controller 360 of the server 300.

Figure 6:
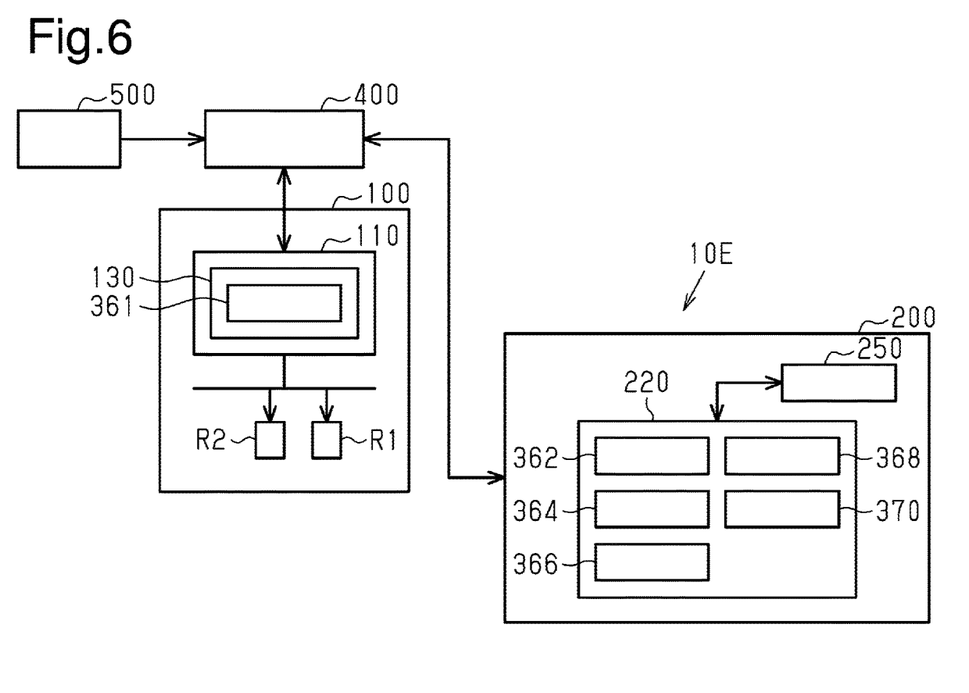
FIG. 6 is a schematic diagram showing a modified example of a configuration of a defrosting control system.

The controller 130 of the control module 110 of the vehicle 100 may include one or more of the functional units, and the controller 220 of the operating terminal 200 may include the remaining functional units. For example, as shown in FIG. 6, the controller 130 of the control module 110 of the vehicle 100 may include the estimated departure time obtainment unit 361, and the controller 220 of the operating terminal 200 may include the information obtainment unit 362, the frost formation rate calculator 364, the operation period calculator 366, the operation start time determination unit 368, and the defrosting controller 370. In this case, the control module 110 of the vehicle 100 and the operating terminal 200 configure a defrosting control system 10E. In this case, the controller 130 of the control module 110 stores programs executed by the estimated departure time obtainment unit 361 included in the controller 130 of the control module 110 of the vehicle 100. The controller 220 of the operating terminal 200 or the memory 250 stores programs of the processes executed by the information obtainment unit 362, the frost formation rate calculator 364, the operation period calculator 366, the operation start time determination unit 368, and the defrosting controller 370 included in the controller 220 of the operating terminal 200.

Figure 7:
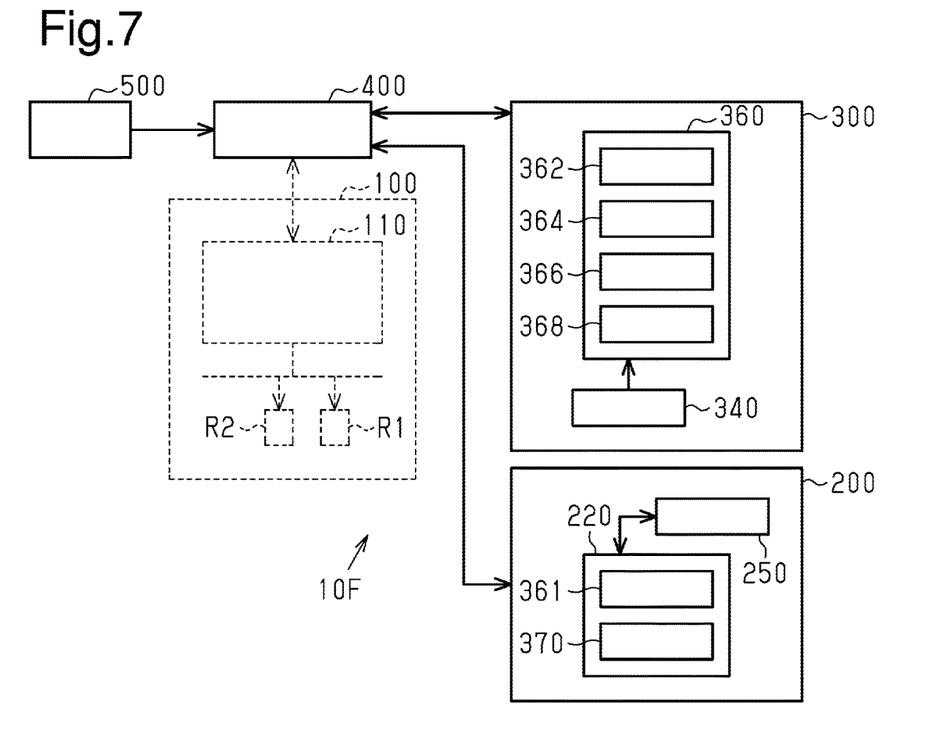
FIG. 7 is a schematic diagram showing a modified example of a configuration of a defrosting control system.

The controller 360 of the server 300 may include one or more of the functional units, and the controller 220 of the operating terminal 200 may include the remaining functional units. For example, as shown in FIG. 7, the controller 360 of the server 300 may include the information obtainment unit 362, the frost formation rate calculator 364, the operation period calculator 366, and the operation start time determination unit 368, and the controller 220 of the operating terminal 200 may include the estimated departure time obtainment unit 361 and the defrosting controller 370. In this case, the server 300 and the operating terminal 200 configure a defrosting control system 10F. In this case, the controller 360 of the server 300 stores programs of the processes executed by the information obtainment unit 362, the frost formation rate calculator 364, the operation period calculator 366, and the operation start time determination unit 368 included in the controller 360 of the server 300. The controller 220 of the operating terminal 200 or the memory 250 stores programs of the processes executed by the estimated departure time obtainment unit 361 and the defrosting controller 370 included in the controller 220 of the operating terminal 200.

Figure 8:
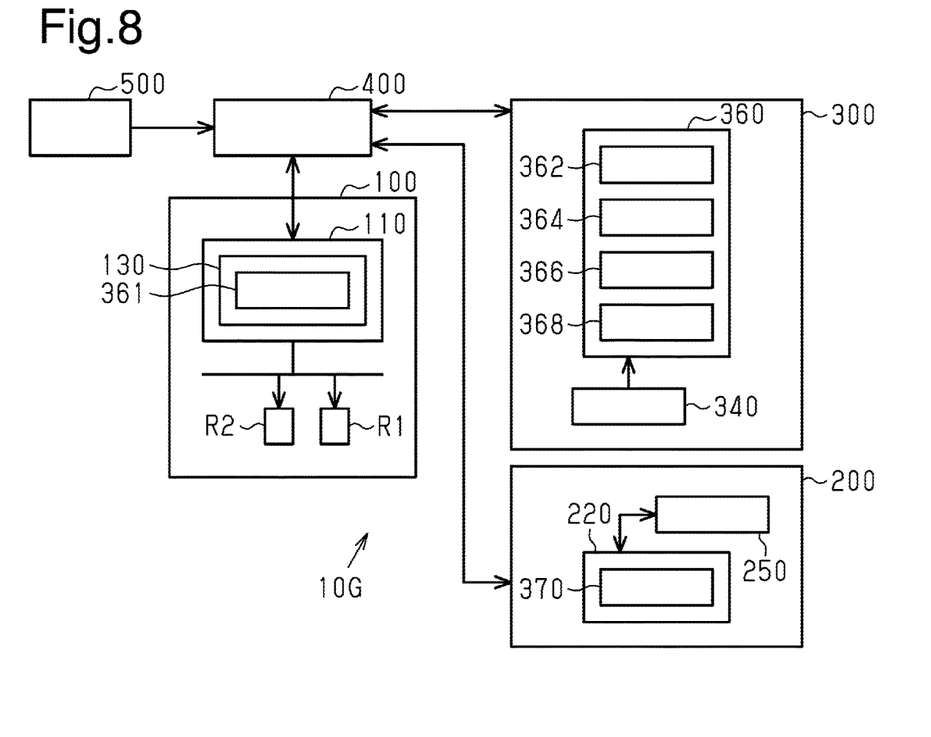
FIG. 8 is a schematic diagram showing a modified example of a configuration of a defrosting control system.

The controller 130 of the control module 110 of the vehicle 100 may include one or more of the functional units, the controller 360 of the server 300 may include one or more of the remaining functional units, and the controller 220 of the operating terminal 200 may include the remaining functional units. For example, as shown in FIG. 8, the controller 130 of the control module 110 of the vehicle 100 may include the estimated departure time obtainment unit 361. The controller 360 of the server 300 may include the information obtainment unit 362, the frost formation rate calculator 364, the operation period calculator 366, and the operation start time determination unit 368. The controller 220 of the operating terminal 200 may include the defrosting controller 370. In this case, the control module 110 of the vehicle 100, the server 300, and the operating terminal 200 configure a defrosting control system 10G. In this case, the controller 130 of the control module 110 stores programs of the processes executed by the estimated departure time obtainment unit 361 included in the controller 130 of the control module 110. The controller 360 of the server 300 stores programs of the processes executed by the information obtainment unit 362, the frost formation rate calculator 364, the operation period calculator 366, and the operation start time determination unit 368 included in the controller 360 of the server 300. The controller 220 of the operating terminal 200 or the memory 250 stores programs of the processes executed by the defrosting controller 370 included in the controller 220 of the operating terminal 200.

The controller 130 of the vehicle 100 and the controller 360 of the server 300 each include a memory that stores a program and an arithmetic processing circuit that runs the program and thus execute a software process. The operating terminal 200 includes the memory 250 storing a program and the controller 220 running the program and thus executes a software process. However, these are only examples. The controller 130 of the vehicle 100, the controller 360 of the server 300, and the operating terminal 200 may each include a dedicated hardware circuit (e.g., ASIC) that processes some of the software processes executed in the embodiment. More specifically, the controller 130 of the vehicle 100, the controller 360 of the server 300, and the operating terminal 200 may each have any one of the following configurations (a) to (c). Configuration (a) includes a processor that executes all of the above-described processes in accordance with programs and a program storage device such as a memory that stores the programs. Configuration (b) includes a processor and a program storage device that execute some of the above-described processes in accordance with the programs and a dedicated hardware circuit that executes the remaining processes. Configuration (c) includes a dedicated hardware circuit that executes all of the above-described processes. A plurality of software circuits each including a processor and a program storage device and a plurality of dedicated hardware circuits may be provided. More specifically, the above-described processes may be executed by processing circuitry that includes at least one of one or more software circuits or one or more dedicated hardware circuits. The program storage device, or a computer readable medium, includes any medium that is accessible by a general-purpose computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A defrosting control system, comprising processing circuitry, wherein the processing circuitry includes
   an information obtainment unit configured to obtain frost formation information that is information about formation of frost on a windowpane of a vehicle,
   an estimated departure time obtainment unit configured to obtain an estimated departure time of the vehicle,
   a frost formation rate calculator configured to calculate a frost formation rate based on the frost formation information and the estimated departure time, wherein the frost formation rate indicates a frost formation amount of the windowpane, on which frost is formed at the estimated departure time,
   an operation period calculator configured to calculate an operation period of a defroster,
   an operation start time determination unit configured to determine an activation time of the defroster, and
   a defrosting controller configured to transmit an operation request signal for requesting operation of the defroster, wherein
   the operation period calculator is configured to calculate the operation period needed to remove frost from the windowpane based on the frost formation rate,
   the operation start time determination unit is configured to determine that the activation time is a time earlier than the estimated departure time by the operation period,
   the defrosting controller is configured to transmit the operation request signal for starting operation of the defroster at the activation time,
   the vehicle is a first vehicle,
   a vehicle located in a predetermined range from a current position of the first vehicle is a second vehicle,
   the defrosting control system comprises a data memory configured to store information on an operation state of a defroster of the second vehicle, and
   the frost formation information includes the operation state of the defroster of the second vehicle at a point in time when the frost formation rate calculator calculates the frost formation rate, which is stored in the data memory.

2. The defrosting control system according to claim 1, further comprising a server storing information on the vehicle, wherein
   the server and the defroster are connected by an external communication network, and
   the server includes the information obtainment unit, the estimated departure time obtainment unit, the frost formation rate calculator, the operation period calculator, the operation start time determination unit, and the defrosting controller.

3. The defrosting control system according to claim 1, further comprising an operating terminal connected to the defroster by an external communication network, wherein the processing circuitry includes
   a defrosting confirmation unit configured to transmit defrosting information including the frost formation rate and the activation time to the operating terminal, and
   an operation determination unit configured to determine whether the defrosting controller transmits the operation request signal at the activation time based on information output from the operating terminal in response to the defrosting information.

4. The defrosting control system according to claim 1, further comprising a data memory configured to store forecasted values of an ambient temperature and humidity at the estimated departure time at a current position of the vehicle,
wherein the frost formation information includes the forecasted values of the ambient temperature and humidity at the estimated departure time at the current position of the vehicle, which are stored in the data memory.

5. The defrosting control system according to claim 1, wherein
the vehicle includes a camera that monitors the windowpane, and
the frost formation information includes an image of the windowpane captured by the camera at a point in time when the frost formation rate calculator calculates the frost formation rate of the windowpane.

6. A non-transitory computer readable medium storing a defrosting control program that, when run by one or more computers, causes the one or more computers to execute
an information obtaining process that obtains frost formation information that is information about formation of frost on a windowpane of a vehicle,
an estimated departure time obtaining process that obtains an estimated departure time of the vehicle,
a frost formation rate calculating process that calculates a frost formation rate based on the frost formation information and the estimated departure time, wherein the frost formation rate indicates a frost formation amount of the windowpane, on which frost is formed at the estimated departure time,
an operation period calculating process that calculates an operation period of a defroster,
an operation start time determining process that determines an activation time of the defroster, and
a defrosting controlling process that transmits an operation request signal for requesting operation of the defroster, wherein
the operation period calculating process includes a process calculating the operation period needed to remove frost from the windowpane based on the frost formation rate,
the operation start time determining process includes a process determining that the activation time is a time earlier than the estimated departure time by the operation period,
the defrosting controlling process includes a process transmitting the operation request signal for starting operation of the defroster at the activation time,
the vehicle is a first vehicle,
a vehicle located in a predetermined range from a current position of the first vehicle is a second vehicle, and
the frost formation information includes an operation state of the defroster of the second vehicle at a point in time when the frost formation rate calculator calculates the frost formation rate, which is stored in a data memory configured to store information on the operation state of a defroster of the second vehicle.

* * * * *